United States Patent
Al-Yousef et al.

(10) Patent No.: US 11,687,053 B2
(45) Date of Patent: Jun. 27, 2023

(54) INTELLIGENT SAFETY MOTOR CONTROL CENTER (ISMCC)

(71) Applicant: Saudi Arabian Oil Company, Dhahran (SA)

(72) Inventors: Bander R. Al-Yousef, Al Mubarraz (SA); Mohammed S. Al-Ahmadi, Dhahran (SA); Soloman Moses Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/194,927

(22) Filed: Mar. 8, 2021

(65) Prior Publication Data
US 2022/0283562 A1 Sep. 8, 2022

(51) Int. Cl.
| G05B 19/05 | (2006.01) |
| G05B 9/02 | (2006.01) |
| G05B 13/02 | (2006.01) |
| G05B 23/02 | (2006.01) |

(52) U.S. Cl.
CPC ............ *G05B 19/058* (2013.01); *G05B 9/02* (2013.01); *G05B 13/0265* (2013.01); *G05B 23/0235* (2013.01); *G05B 23/0267* (2013.01)

(58) Field of Classification Search
None
See application file for complete search history.

(56) References Cited

U.S. PATENT DOCUMENTS

| 3,104,549 A | 9/1963 | Humbert et al. |
| 3,316,767 A | 5/1967 | Liebert |
| 3,373,608 A | 3/1968 | Ketelsen |
| 4,051,723 A | 10/1977 | Head et al. |

(Continued)

FOREIGN PATENT DOCUMENTS

| CN | 102520388 | 6/2012 |
| CN | 203322437 | 12/2013 |

(Continued)

OTHER PUBLICATIONS

AirMagnet Survey User Guide, NetAlly, Oct. 2019, 382 pages.
(Continued)

*Primary Examiner* — Kenneth M Lo
*Assistant Examiner* — Istiaque Ahmed
(74) *Attorney, Agent, or Firm* — Fish & Richardson P.C.

(57) ABSTRACT

Some implementations provides a system to implement a safety control at an oil and gas facility, the system comprising: one or more motor control centers, each comprising a network interface, and a programmable logic controller (PLC), wherein each motor control center is configured to monitor and control one or more field devices coupled thereto, and wherein a plurality of field devices are dispersed at the oil and gas facility; and a safety instrumented system (SIS) in communication with the one or more motor control centers through the network interface thereof, wherein each motor control center is configured to communicate with the SIS without an interposing relay, and wherein the SIS comprises control elements configured to implement the safety control at the oil and gas facility based on communication with each motor control center through the network interface thereof.

12 Claims, 4 Drawing Sheets

(56) References Cited

U.S. PATENT DOCUMENTS

| | | |
|---|---|---|
| RE31,186 E | 3/1983 | Rosenweig |
| 4,517,846 A | 5/1985 | Harrison et al. |
| 4,757,314 A | 7/1988 | Aubin |
| 4,777,833 A | 10/1988 | Carpenter |
| 4,901,018 A | 2/1990 | Lew |
| 4,965,996 A | 9/1990 | Morris |
| 5,067,345 A | 11/1991 | Mougne |
| 5,090,250 A | 2/1992 | Wada |
| 5,164,897 A | 11/1992 | Clark |
| 5,259,239 A | 11/1993 | Gaisford |
| 5,392,648 A | 2/1995 | Robertson |
| 5,417,118 A | 5/1995 | Lew et al. |
| 5,586,310 A | 12/1996 | Sharman |
| 5,975,204 A | 11/1999 | Tubel et al. |
| 6,006,831 A | 12/1999 | Schlemmer et al. |
| 6,046,685 A | 4/2000 | Tubel |
| 6,085,599 A | 7/2000 | Feller |
| 6,106,032 A | 8/2000 | Och |
| 6,163,257 A | 12/2000 | Tracy |
| 6,237,424 B1 | 5/2001 | Salmasi et al. |
| 6,356,844 B2 | 3/2002 | Thomas et al. |
| 6,463,807 B1 | 10/2002 | Feller |
| 6,626,048 B1 | 8/2003 | Dam Es et al. |
| 6,747,372 B2 | 6/2004 | Gilbreth et al. |
| 6,882,904 B1 | 4/2005 | Petrie et al. |
| 6,920,799 B1 | 7/2005 | Schulz |
| 6,950,825 B2 | 9/2005 | Chang et al. |
| 7,015,800 B2 | 3/2006 | Lesesky et al. |
| 7,259,688 B2 | 8/2007 | Hirsch et al. |
| 7,265,544 B2 | 9/2007 | Keese |
| 7,469,188 B2 | 12/2008 | Wee |
| 7,478,024 B2 | 1/2009 | Gurpinar et al. |
| 7,493,140 B2 | 2/2009 | Michmerhuizen et al. |
| 7,536,547 B2 | 5/2009 | Van Den Tillaart |
| 7,540,202 B2 | 6/2009 | Bier |
| 7,574,907 B2 | 8/2009 | Maute |
| 7,584,165 B2 | 9/2009 | Buchan |
| 7,644,290 B2 | 1/2010 | Ransom et al. |
| 7,653,936 B2 | 1/2010 | Oberst |
| 7,739,359 B1 | 6/2010 | Millet et al. |
| 7,828,065 B2 | 11/2010 | Ross |
| 7,933,989 B1 | 4/2011 | Barker et al. |
| 7,940,302 B2 | 5/2011 | Mehrotra et al. |
| 8,039,991 B2 | 10/2011 | Wakitani et al. |
| 8,051,722 B2 | 11/2011 | Voigt et al. |
| 8,102,238 B2 | 1/2012 | Golander et al. |
| 8,195,590 B1 | 6/2012 | Storek |
| 8,271,212 B2 | 9/2012 | Sai et al. |
| 8,280,635 B2 | 10/2012 | Ella et al. |
| 8,312,320 B2 | 11/2012 | Almadi |
| 8,323,392 B2 | 12/2012 | Jones et al. |
| 8,334,775 B2 | 12/2012 | Tapp et al. |
| 8,359,171 B2 | 1/2013 | Bleys et al. |
| 8,365,250 B2 | 1/2013 | Denny |
| 8,365,612 B2 | 2/2013 | Izumi |
| 8,543,716 B1 | 9/2013 | Rashidi |
| 8,667,091 B2 | 3/2014 | Almadi |
| 8,732,106 B1 | 5/2014 | Presgraves et al. |
| 8,750,513 B1 | 6/2014 | Renkis |
| 8,761,911 B1 | 6/2014 | Chapman et al. |
| 8,792,115 B2 | 7/2014 | Harano |
| 8,875,379 B2 | 11/2014 | Maute |
| 8,884,759 B2 | 11/2014 | Oktem et al. |
| 8,887,241 B2 | 11/2014 | Britton et al. |
| 8,972,742 B2 | 3/2015 | Troncoso Pastoriza et al. |
| 9,147,174 B2 | 9/2015 | Glickman et al. |
| 9,208,676 B2 | 12/2015 | Fadell et al. |
| 9,210,179 B2 | 12/2015 | Mevec et al. |
| 9,396,599 B1 | 7/2016 | Malhotra |
| 9,467,472 B2 | 10/2016 | Weiner et al. |
| 9,699,768 B2 | 7/2017 | Werb |
| 9,760,075 B2 | 9/2017 | Fisher-Rosemont |
| 10,088,840 B2 | 10/2018 | Dorval et al. |
| 10,330,511 B2 | 6/2019 | Alkhabbaz et al. |
| 10,462,884 B2 | 10/2019 | Jayawardena et al. |
| 10,466,722 B2 | 11/2019 | Mortensen et al. |
| 10,514,415 B2 | 12/2019 | Jayawardena et al. |
| 10,551,047 B2 | 2/2020 | Treible, Jr. et al. |
| 10,897,398 B2 | 1/2021 | Al-Yousef et al. |
| 2002/0152053 A1 | 10/2002 | Roy et al. |
| 2003/0117298 A1 | 6/2003 | Seely |
| 2004/0045368 A1 | 3/2004 | Schoeb |
| 2004/0098592 A1 | 5/2004 | Taki |
| 2004/0188710 A1 | 9/2004 | Koren et al. |
| 2004/0262008 A1* | 12/2004 | Deans ............... H04B 3/50 |
| | | 166/344 |
| 2005/0015624 A1 | 1/2005 | Ginter et al. |
| 2005/0184084 A1 | 8/2005 | Wells |
| 2005/0193832 A1 | 9/2005 | Tombs et al. |
| 2005/0228683 A1 | 10/2005 | Saylor et al. |
| 2006/0032547 A1 | 2/2006 | Rossi |
| 2006/0085174 A1 | 4/2006 | Hemanthkumar |
| 2006/0086497 A1 | 4/2006 | Ohmer et al. |
| 2006/0107061 A1 | 5/2006 | Holovacs |
| 2007/0018009 A1 | 1/2007 | Choi et al. |
| 2007/0126576 A1 | 6/2007 | Script et al. |
| 2007/0163359 A1 | 7/2007 | Nielsen |
| 2007/0193834 A1 | 8/2007 | Pai |
| 2007/0198223 A1 | 8/2007 | Ella et al. |
| 2008/0061984 A1 | 3/2008 | Breed et al. |
| 2008/0109883 A1 | 5/2008 | Hernoud et al. |
| 2008/0109889 A1 | 5/2008 | Bartels et al. |
| 2008/0139195 A1 | 6/2008 | Marsyla et al. |
| 2008/0228908 A1 | 9/2008 | Link |
| 2008/0251260 A1 | 10/2008 | Ross et al. |
| 2008/0274766 A1 | 11/2008 | Pratt et al. |
| 2009/0012631 A1 | 1/2009 | Fuller |
| 2009/0037607 A1 | 2/2009 | Farinacci et al. |
| 2009/0089108 A1 | 4/2009 | Angell et al. |
| 2009/0141896 A1 | 6/2009 | McCown |
| 2009/0210081 A1 | 8/2009 | Sustaeta |
| 2009/0224930 A1 | 9/2009 | Burza |
| 2010/0097205 A1 | 4/2010 | Script |
| 2010/0228584 A1 | 9/2010 | Nash |
| 2010/0231410 A1 | 9/2010 | Seisenberger |
| 2010/0292857 A1 | 11/2010 | Bose et al. |
| 2011/0066454 A1 | 3/2011 | Rosauer et al. |
| 2011/0071963 A1 | 3/2011 | Piovesan et al. |
| 2011/0074551 A1 | 3/2011 | Higashionji |
| 2011/0178977 A1 | 7/2011 | Drees |
| 2011/0181426 A1 | 7/2011 | Bucciero et al. |
| 2011/0288692 A1 | 11/2011 | Scott |
| 2011/0296377 A1 | 12/2011 | Morozov et al. |
| 2012/0022700 A1 | 1/2012 | Drees et al. |
| 2012/0031494 A1* | 2/2012 | Lymberopoulos ...... E21B 34/02 |
| | | 137/1 |
| 2012/0059634 A1 | 3/2012 | Bouzarkouna |
| 2012/0060030 A1 | 3/2012 | Lamb |
| 2012/0063354 A1 | 3/2012 | Vanga et al. |
| 2012/0084400 A1 | 4/2012 | Almadi et al. |
| 2012/0162423 A1 | 6/2012 | Xiao |
| 2012/0172085 A1 | 7/2012 | Vuppu |
| 2012/0307051 A1 | 12/2012 | Welter |
| 2013/0085687 A1 | 4/2013 | Danov et al. |
| 2013/0086650 A1 | 4/2013 | Soundrapandian et al. |
| 2013/0088429 A1 | 4/2013 | Yang |
| 2013/0103749 A1 | 4/2013 | Weth et al. |
| 2013/0110411 A1 | 5/2013 | Black et al. |
| 2013/0136597 A1 | 5/2013 | Hansen et al. |
| 2013/0151020 A1 | 6/2013 | Manninen et al. |
| 2013/0162405 A1 | 6/2013 | Forster |
| 2013/0212259 A1 | 8/2013 | Rankov et al. |
| 2013/0232338 A1 | 9/2013 | Byres et al. |
| 2013/0247117 A1 | 9/2013 | Yamada |
| 2013/0282641 A1 | 10/2013 | Martin et al. |
| 2014/0019768 A1 | 1/2014 | Pineau et al. |
| 2014/0046863 A1 | 2/2014 | Gifford et al. |
| 2014/0089671 A1 | 3/2014 | Logue |
| 2014/0118239 A1 | 5/2014 | Phillips |
| 2014/0130874 A1* | 5/2014 | Burlage ............... G01F 25/22 |
| | | 700/19 |
| 2014/0139681 A1 | 5/2014 | Jones, Jr. et al. |
| 2014/0150549 A1 | 6/2014 | Rieger et al. |
| 2014/0156584 A1 | 6/2014 | Motukuri et al. |

(56) References Cited

U.S. PATENT DOCUMENTS

| | | |
|---|---|---|
| 2014/0165182 A1 | 6/2014 | Curry et al. |
| 2014/0230057 A1 | 8/2014 | Berger |
| 2014/0240088 A1 | 8/2014 | Robinette |
| 2014/0254799 A1 | 9/2014 | Husted |
| 2014/0261791 A1 | 9/2014 | Grabau et al. |
| 2014/0280953 A1 | 9/2014 | Brzozowski et al. |
| 2014/0310059 A1 | 10/2014 | Ellis |
| 2014/0337086 A1 | 11/2014 | Asenjo et al. |
| 2014/0342373 A1 | 11/2014 | Viovy et al. |
| 2014/0343717 A1 | 11/2014 | Dorval et al. |
| 2015/0074023 A1 | 3/2015 | Gu |
| 2015/0109104 A1 | 4/2015 | Fadell |
| 2015/0116111 A1 | 4/2015 | Foster |
| 2015/0195789 A1 | 7/2015 | Yoon |
| 2015/0220321 A1 | 8/2015 | Jung |
| 2016/0006745 A1 | 1/2016 | Furuichi |
| 2016/0100437 A1 | 4/2016 | Amstrong et al. |
| 2016/0123111 A1 | 5/2016 | Kim |
| 2016/0206136 A1 | 7/2016 | Storek |
| 2016/0234239 A1 | 8/2016 | Knapp et al. |
| 2016/0259637 A1 | 9/2016 | Kumar |
| 2016/0259647 A1 | 9/2016 | Kim et al. |
| 2016/0379211 A1 | 12/2016 | Hoyos |
| 2017/0031840 A1 | 2/2017 | Cawse et al. |
| 2017/0034193 A1 | 2/2017 | Schulman et al. |
| 2017/0053224 A1 | 2/2017 | Duca et al. |
| 2017/0061715 A1 | 3/2017 | Busch-Sorensen |
| 2017/0184659 A1 | 6/2017 | Jayawardena et al. |
| 2017/0284191 A1 | 10/2017 | Martin |
| 2017/0289812 A1 | 10/2017 | Werb |
| 2017/0353491 A1 | 12/2017 | Gukal |
| 2017/0356780 A1 | 12/2017 | Smith et al. |
| 2018/0092331 A1 | 4/2018 | Zuidhof |
| 2018/0156437 A1 | 6/2018 | Freer et al. |
| 2019/0033852 A1 | 1/2019 | Dorval et al. |
| 2019/0149894 A1 | 5/2019 | Weatherhead et al. |
| 2019/0159322 A1 | 5/2019 | Jayawardena et al. |
| 2019/0162330 A1* | 5/2019 | Al-Ajmi .............. E21B 34/10 |
| 2019/0234603 A1 | 8/2019 | Treible, Jr. et al. |
| 2019/0306250 A1* | 10/2019 | Kubo .............. H04L 67/141 |
| 2019/0346839 A1 | 11/2019 | Dorval et al. |
| 2019/0349254 A1 | 11/2019 | Nolan et al. |
| 2020/0190931 A1* | 6/2020 | Moen .............. E21B 41/0007 |
| 2020/0208510 A1* | 7/2020 | Guijt .............. E21B 47/13 |
| 2020/0239329 A1 | 7/2020 | Patey |
| 2020/0252288 A1 | 8/2020 | Al-Yousef et al. |
| 2020/0371514 A1 | 11/2020 | Dorval et al. |
| 2021/0115782 A1* | 4/2021 | Mujica .............. E21B 47/06 |
| 2021/0404315 A1* | 12/2021 | Parak .............. G06N 5/003 |
| 2022/0162923 A1* | 5/2022 | Signaroldi .......... E21B 33/0355 |

FOREIGN PATENT DOCUMENTS

| | | |
|---|---|---|
| EP | 0770856 | 9/2003 |
| EP | 1612741 | 1/2006 |
| EP | 1832548 | 12/2007 |
| EP | 2396273 | 12/2011 |
| EP | 3196716 | 7/2017 |
| GB | 1493527 | 11/1977 |
| JP | H 07152789 | 6/1995 |
| JP | 2014119266 | 6/2014 |
| WO | WO 2009000283 | 12/2008 |
| WO | WO 2015058134 | 4/2015 |
| WO | WO 2016073267 | 5/2016 |
| WO | WO 2016097998 | 6/2016 |
| WO | WO 2018207123 | 11/2018 |

OTHER PUBLICATIONS

Almadi, "Intelligent Field Infrastructure Adoption: Approach and Best Practices," SPE 150066, Society of Petroleum Engineers (SPE), presented at the SPE intelligent Energy International Conference, Mar. 27-29, 2012, 12 pages.

Boman, "IoT Technology to Reduce Need for Oil, Gas Workers Offshore," Oct. 14, 2016, rigzone.com (online), retrieved from URL <https://www.rigzone.com/news/oil_gas/a/147044/iot_technology_to_reduce_need_for_oil_gas_workers_offshore/>, 5 pages.

Canaz, "Planar and Linear Feature-Based Registration of Terrestrial Laser Scans with Minimum Overlap Using Photogrammetric Data," Masters Thesis, University of Calgary, Dec. 2012, 142 pages.

Cohen, "Reducing Business Surprises through Proactive, Real-Time Sensing and Alert Management," EESR Workshop on End-to-End, Sense-and Respond Systems, Applications and Services, 2005, 6 pages.

Ekahau Pro, Ekahau.com, 2020, 2 pages.

Gokce et al., "Vision-Based Detection and Distance Estimation of Micro Unmanned Aerial Vehicles," Sensors, 2015, 15:23805-23846, 42 pages.

Hale, "Evaluating safety management and culture interventions to improve safety: Effective intervention strategies," Safety Science, Oct. 2010, 48:8 (1026-1035), 10 pages.

Huia et al., "Prediction of Safety Objective of an Enterprise using Fuzzy Neural Network," International Symposium on Safety Science and Engineering in China, Procedia Engineering, 43: 162-167, 2012, 6 pages.

Husain et al., "Quantifying the Intelligent Field Added Values," SPE 167439, Society of Petroleum Engineers (SPE), presented at the SPE Middle East Intelligent Energy Conference and Exhibition, Oct. 28-30, 2013, 9 pages.

Memon et al., "Distributed control system for process control using intelligent agents," WSEAS Transactions on Systems, retrieved from URL <:https://www.researchgate.net/publication/270214069_Distributed_control_system_for_process_control_using_intelligent_agents>, retrieved on May 17, 2019, available on or before Mar. 1, 2006, 10 pages.

offshore-technology.com (online), "Take Control: Smart Valves Step Forward," retrieved from URL <http://www.offshore-technology.com/features/feature2034/>, Jun. 18, 2008, 6 pages.

Petrie et al., "Chapter 1: Introduction to Laser Ranging, Profiling, and Scanning," Topographic Laser Ranging and Scanning: Principles and Processing, 2008, 29 pages.

Petrie et al., "Chapter 3: Terrestrial Laser Scanners," Topographic Laser Ranging and Scanning: Principles and Processing, 2009, 43 pages.

pyimagesearch.com [online], Rosebrock, "Find distance from camera to object/marker using Python and OpenCV," Jan. 2015, retrieved on Oct. 21, 2020, retrieved from URL <https://www.pyimagesearch.com/2015/01/19/find-distance-camera-objectmarker-using-python-opencv/>, 109 pages.

Sample VisiWave Site Survey Report, VisiWave, Aug. 2012, 23 pages.

Storey, "Building a Maintenance Management Program for Valves," Control Engineering, controleng.com (online), retrieved from URL <http://www.controleng.com/industry-news/single-article/building-a-maintenance-management-program-for-valves/20afd59f11c5dec4ec222cc79937e40b.html>, Apr. 17, 2014, 3 pages.

forumautomation.com [online], "Working of Interposing Relays in PLCs," Jan. 3, 2018, retrieved on Mar. 5, 2021, retrieved from URL <https://forumautomation.com/t/working-of-interposingrelays-in-plcs/2918>, 3 pages.

* cited by examiner

INTELLIGENT SAFETY MOTOR CONTROL CENTER (ISMCC)

TECHNICAL FIELD

This disclosure generally relates to industrial process automation.

BACKGROUND

In the oil and gas industry, a production plant may span a geographic area in which a large number of devices may operate in tandem. These industrial devices are often monitored and controlled remotely and automatically to maintain the successful operation of the production plant.

SUMMARY

Some implementations provide a system to implement a safety control at an oil and gas facility, the system comprising: one or more motor control centers, each comprising a network interface, and a programmable logic controller (PLC), wherein each motor control center is configured to monitor and control one or more field devices coupled thereto, and wherein a plurality of field devices are dispersed at the oil and gas facility; and a safety instrumented system (SIS) in communication with the one or more motor control centers through the network interface thereof, wherein each motor control center is configured to communicate with the safety instrumented system without an interposing relay, and wherein the safety instrumented system comprises control elements configured to implement the safety control at the oil and gas facility based on communication with each motor control center through the network interface thereof.

Implementations may include one or more of the following features.

The network interface may be configured to accommodate at least one redundant communication path from each motor control center to the safety instrumented system. The network interface may be compliant with a safety standard for automatic protection of the field devices dispersed at the oil and gas facility. The safety standard may include: an International Electrotechnical Commission (IEC) 61508 standard, an IEC 61511 standard.

Each motor control center may include triplicate or 1oo2D (one-out-of-two with diagnostics) components such that each motor control center can meet a threshold level of fault tolerance. The threshold level of fault tolerance may be Safety Integrity Level (SIL) 3, and wherein each motor control center may be rated at SIL 3. Each motor control center and the safety instrumented system may be synchronized with an accuracy under 1 millisecond. Each motor control center may be configured to communicate with the one or more field device according to a communication protocol, wherein the communication protocol comprises one of: a Highway Addressable Remote Transducer (HART) protocol, a Foundation Fieldbus protocol, or a RS 485 protocol. Each motor control center may further include a computing module coupled to the PLC and configured to: receive, from the PLC, data encoding diagnostic information of the one or more field devices and measurements from the one or more field devices; and process the data using machine learning algorithms to predict a performance of the one or more field devices. The computing module may be further configured to store the data, and wherein the machine learning algorithms are trained based on the stored data.

In another aspect, some implementations may provide a method to implement a safety control of an industrial process running at an oil and gas facility, the method comprising: operating one or more motor control centers, each comprising a network interface, and a programmable logic controller (PLC), wherein each motor control center is configured to monitor and control one or more field devices coupled thereto, and wherein a plurality of field devices are dispersed at the oil and gas facility during the industrial process; and operating a safety instrumented system (SIS) in communication with the one or more motor control centers through the network interface thereof, wherein each motor control center is configured to communicate with the safety instrumented system without an interposing relay, and wherein the safety instrumented system comprises control elements configured to implement the safety control of the industrial process running at the oil and gas facility based on communication with each motor control center through the network interface thereof.

Implementations may include one or more of the following features.

The method may further include: establishing, through the network interface, at least one redundant communication path from each motor control center to the safety instrumented system. The network interface may be compliant with a safety standard for automatic protection of field devices operating at the oil and gas facility. The safety standard may include one of: an International Electrotechnical Commission (IEC) 61508 standard, an IEC 61511 standard.

Each motor control center may include triplicate or 1oo2D (one-out-of-two with diagnostics) components such that each motor control center can meet a threshold level of fault tolerance. The threshold level of fault tolerance may be Safety Integrity Level (SIL) 3, and wherein each motor control center may be rated at SIL 3. Each motor control center and the safety instrumented system may be synchronized with an accuracy under 1 millisecond. Each motor control center may be configured to communicate with the one or more field device according to a communication protocol, wherein the communication protocol comprises one of: a Highway Addressable Remote Transducer (HART) protocol, a Foundation Fieldbus protocol, or a RS 485 protocol. Each motor control center may further include a computing module coupled to the PLC and configured to: receive, from the PLC, data encoding diagnostic information of the one or more field devices and measurements from the one or more field devices; and process the data using machine learning algorithms to predict a performance of the one or more field devices. The computing module may be further configured to store the data, and wherein the machine learning algorithms are trained based on the stored data.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features,

DESCRIPTION OF DRAWINGS

Like reference numbers and designations in the various drawings indicate like elements.

DETAILED DESCRIPTION

In the oil and gas industry, a production site can operate a large number of physical devices including, for example, motors, pumps, monitoring devices, robotics devices, storage devices. The equipment can span a relatively large geographic area, for example, at an oil field. Generally, the equipment in the field can consume energy, for example, in the form of electricity. A networked control system can be used to monitor and control the function of the equipment in the field. In a conventional control system, all signals between the motor control center and safety systems are hardwired through an interposing relay cabinet installed within substations.

Implementations described by the present disclosure include an integrated apparatus platform, centrally or distributed deployed, that can continuously operate in real-time mode to monitor and control the safe operations of oil field equipment. Here, the safe operation refers to fault tolerance and redundancy in the presence of hardware failure. The implementations can include an intelligent safety motor control center (ISMCC) that proactively improves system architecture by, for example, eliminating the interposing relay cabinet for interfacing the signals to the safety instrumented system. As such, the implementations can reduce system size, complexity and cost. Implementations can incorporate intrinsic system and network design that is Safety Integrity Level (SIL) 3 rated and compliant with the IEC61508/IEC61511 standards and specifications. Some implementations may be equipped with a program logic controller (PLC), power supply, and communication devices. In some cases, the PLC is directly connected with a local computer to have a local human machine interface. Some implementations can incorporate an ISMCC network system interface to the safety instrumented system (SIS) based on single mode or multimode fiber cable strands. In these implementations, the ISMCC may connect directly to both motor control center and SIS. The interconnection can be also achieved using a switched computer network.

The terminology used in the present disclosure includes the following terms.

The term "machine learning analytics" refers to the use of machine learning and applied statistics to predict unknown conditions based on the available data. Two general areas that fall under machine learning analytics are classification and regression. While classification refers to the prediction of categorical values, regression connotes the prediction of continuous numerical values. One machine learning implementation is also known as "supervised learning" where the "correct" target or y values are available. For illustration, the goal of some implementations is to learn from the available data to predict the unknown values with some defined error metrics. In supervised learning, for example, there are a set of known predictors (features) $x_1, x_2, \ldots, x_m$ which are known to the system as well as the target values $y_1, y_2, \ldots y_n$, which are to be inferred. The system's objective is to train a machine learning model to predict new target values $y_1, y_2, \ldots, y_n$ by observing new features.

The implementations can employ a variety of machine learning algorithms. For classification, examples of prediction algorithms can include, logistic regression, decision trees, nearest neighbor, support vector machines, K-means clustering, boosting, and neural networks. For regression, examples of predication algorithms can include least squares regression, Lasso, and others. The performance of an algorithm can depend on a number factors, such as the selected set of features, training/validation method and hyper-parameters tuning. As such, machine learning analytics can manifest as an iterative approach of knowledge finding that includes trial and error. An iterative approach can iteratively modify data preprocessing and model parameters until the result achieves the desired properties.

Figure 1:
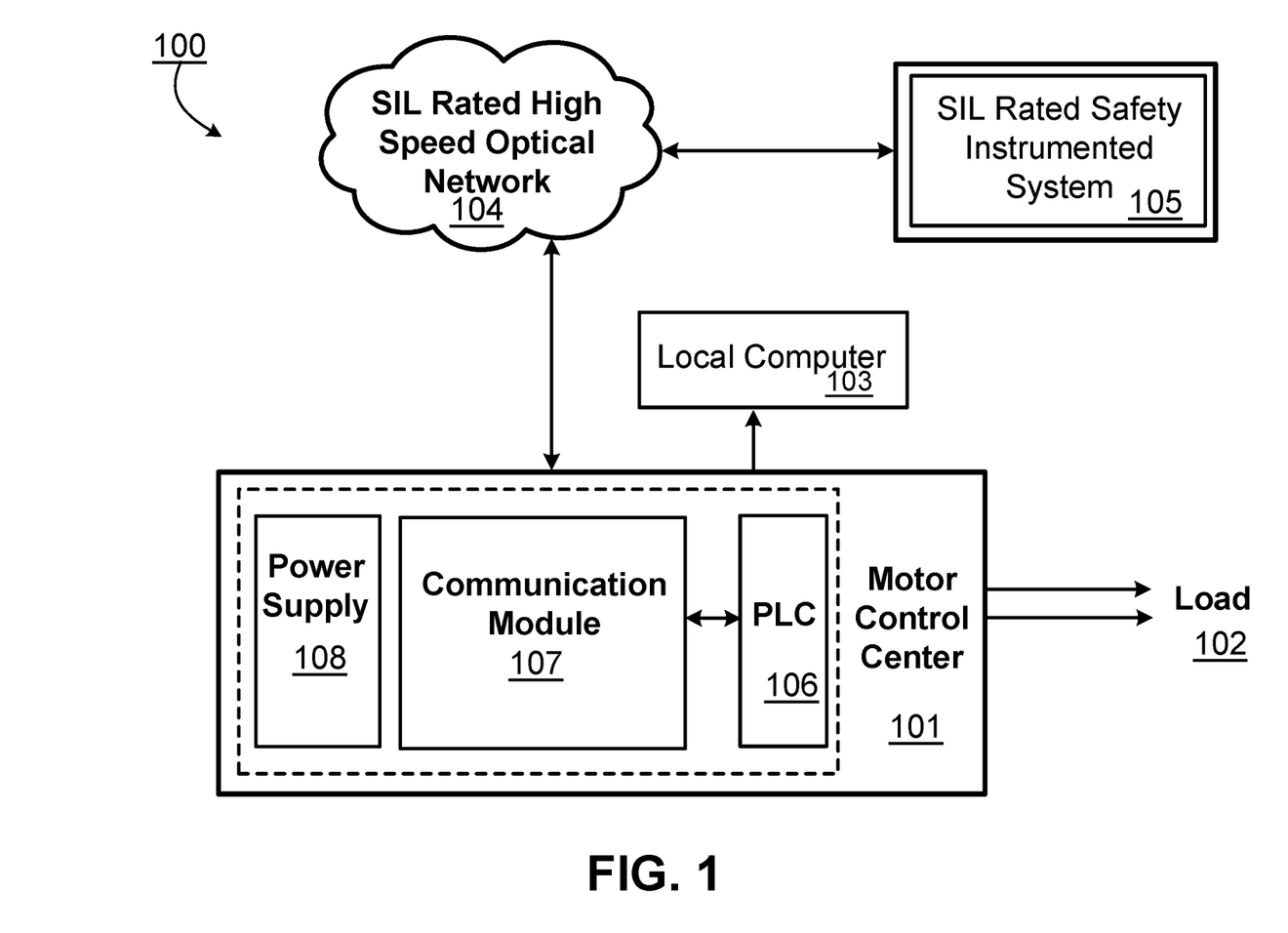
FIG. 1 is a diagram illustrating an example of an apparatus for implementing intelligent industrial control according to an implementation of the present disclosure.

Referring to FIG. 1, diagram 100 shows an apparatus platform that integrates an intelligent safety motor safety control center (ISMCC) 101. The ISMCC 101 can be centrally or distributed deployed in the system for implementing safety control of an industrial process running at the oil and gas facility. In some cases, the ISMCC 101 can have an interface to a local computer (103). The ISMCC 101 can include an interface to a safety integrity level (SIL) rated high speed optical network 104. Through this network 104, the ISMCC 101 can communicate with a safety instrumented system (SIS) 105. The interface on ISMCC 101 may be configured to support at least one redundant communication path from each motor control center to the safety instrumented system. In various implementations, the ISMCC 101 can proactively optimize system architecture by, for example, eliminating interposing relay cabinet for interfacing the signals from the ISMCC to the safety instrumented system 105. Indeed, implementations can incorporate system and network design compliant with the IEC61508/IEC61511 standards and specifications. The ISMCC 101 can continuously operate in real-time mode to monitor and control load 102.

Load 102 can include one or more field devices that consume electricity. Examples of the field devices can include pumps, motors, valves, monitoring devices, robotics devices, and storage devices. These field devices are industrial equipment that can be dispersed throughout the oil and gas facility. The field devices participate in an industrial process running at the oil and gas facility. As such, these filed devices can fail and the control system design of the present disclosure presents technical solutions to monitor, predict, and handle device failure without the use of an interposing relay cabinet, which can be bulky and costly. The field devices can generate measurement data characterizing an aspect of the industrial process (e.g., flow rate, air or fluid pressure). The field devices can also generate diagnostic information such as an indication of the operating status (e.g., full, empty, idle, overload, etc.).

ISMCC 101 can include programmable logic controller (PLC) 106, communication module 107, and power supply

108. The power supply is generally responsible for powering the local electronics on ISMCC 101. In some implementations, PLC 106 is equipped with a redundant Central Processing Unit (CPU) running at, for example, 1.9 GHZ or higher with scanning execution cycle configured from 50 msec with an increment of 5 msec for input/output (I/O) scan and execution of both application and diagnostics. As an illustration, PLC 106 may include a minimum of 1 GB RAM plus 8 MB FLASH memory for both processing and storing collected data. In these implementations, the redundant CPUs can read and write to a single memory and or a redundant memory with automated synchronization. In one case, ISMCC 101 may have a time synchronization based on a broadcast from a system server (e.g., a network time server) or a GPS time receiver to achieve a synchronization accuracy of under, for example, one millisecond. ISMCC 101 can support a local or remote programming interface via a laptop computer (e.g., local computer 103). In some implementations, ISMCC 101 can include triplicate or 1oo2D (one-out-of-two with diagnostics) components such that the ISMCC 101 can meet a fault tolerance level of safety integrity level (SIL) 3. The communications between ISMCC 101 and safety instrumented system 105 are implemented through redundant network interfaces. In the implementations, each time a communication is received, an acknowledgment is transmitted to the transmitter and an error check is performed on the received message to validate the integrity of the received message. Moreover, ISMCC 101 can interface with load 102 by reading data from and write data to field devices. These field devices can include analog or smart field devices, which can be wired or wireless devices. ISMCC 101 may communicate with the field devices (e.g., smart field devices) via a communication protocol such as a Highway Addressable Remote Transducer (HART) protocol, a Foundation Fieldbus protocol, or a RS 485 protocol. ISMCC 101 may have built-in protection circuit to protect against common transient surges of up to, for example, 500V in root mean square (RMS) value. ISMCC 101 can include a control console (or through local computer 103) to provide a programmable visual display to indicate a health status of the equipment, a progress status of an operation, or an alarm. ISMCC 101 can automatically store the alarms, as well as control and protection events through programming device. ISMCC 101 can include computing capabilities to display the status and diagnostic information without the use of external devices. The computing capabilities can also receive, from the PLC, data encoding diagnostic information of the one or more field devices and measurements from the one or more field devices; and locally process the data using machine learning algorithms to predict a performance of the one or more field devices. Here, the implementations may incorporate a local human computer interface for data displays and user interactions on, for example, local computer 103. The implementations can store diagnostic information and measurement data as logs. Some implementations can provide data management capabilities with respect to the diagnostic information and measurement data. Data analytics applications running machine learning algorithms can operate on the diagnostic information and measurement data. Some implementations may also train the machine learning algorithms based on the diagnostic information and measurement data. ISMCC 101 can also communicate the stored information to a remote device, for example, through a network interface. In these implementations, the stored information is not perishable in that a reset of ISMCC 101 may not cause the information to be deleted.

ISMCC 101 may also include communication module 107. The communication module 107 may include universal Ethernet redundant port interfaces capable of expanding to, for example, 8 ports each with a speed from 100 Mbps to 1000 Mbps. The interface can support multimode fiber, single mode fiber and RJ45 copper. In some cases, communication module 107 can convert a RS485 connection over copper, over fiber, or over Ethernet. In some cases, the communication module may be integrated with PLC 106. As explained, the communications between the ISMCC and the safety instrumented system are implemented through redundant network interfaces. Moreover, each time a message is received from a transmitter, an acknowledgement is transmitted back to the transmitter and an error check is performed on the received message to validate its integrity.

Figure 2:
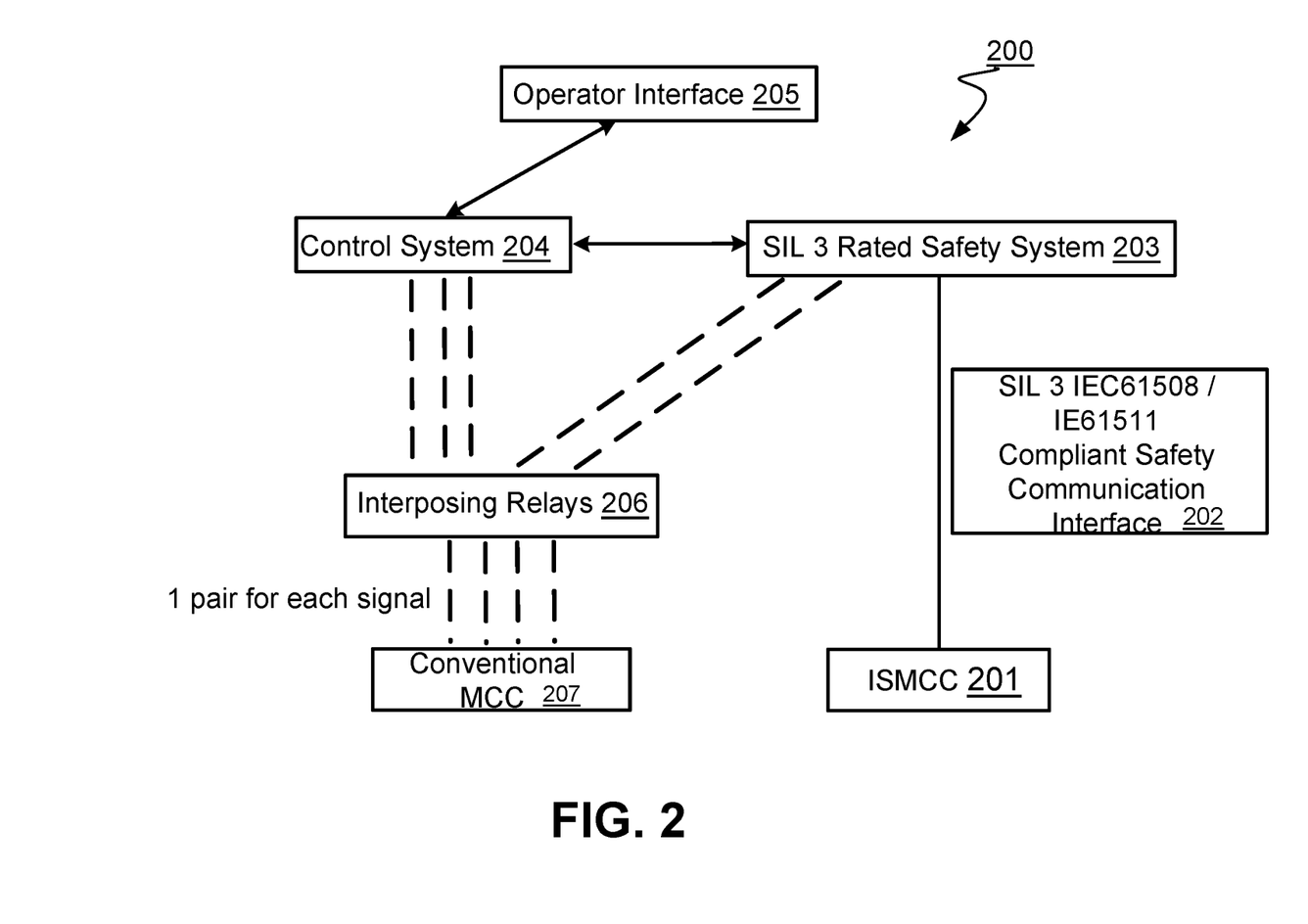
FIG. 2 is a diagram illustrating a comparison between a conventional apparatus and an intelligent apparatus according to an implementation of the present disclosure.

FIG. 2 is a diagram 200 showing an implementation of the present disclosure that eliminates an interposing relay between a conventional motor control center and the safety instrumented system. In more detail, a conventional motor and control center 207 may establish connections with interposing relays 206. The interposing relays 206 can be a cabinet loaded with interposing relays for multiple conventional motor control centers. By way of background, interposing relays can be used between mismatched sensors, controllers, and/or control devices. The interposing relays can protect, for example, controllers from overcurrent in the field. As illustrated, the communicating path (dashed lines) between the interposing relays 206 and conventional MCC 207 can accommodate one pair of each signal to provide redundancy. As illustrated, the interposing relays 206 can provide a communication path (dashed line) to SIL 3 rated safety instrumented system 203 and a separate communication path (dashed line) to control system 204. The two communication paths can provide redundancy to further complete another communication path between control system 204 and SIL 3 rated safety instrumented system 203. As illustrated, all signals between the conventional MCC 207 and the safety instrumented system 203 are hardwired through an interposing relay cabinet installed within substations. An operator interface 205 may allow an operator to access control system 204 to, for example, visualize diagnostic information from field devices, or measurement data from the industrial process being monitored.

As illustrated, in various implementations, interposing relays 206 are no longer needed for interfacing the signals between intelligent safety motor control center (ISMCC) 201 and safety instrumented system 201. The reduction in system size can save operating cost of the full configuration for monitoring and controlling the industrial process. Instead of using an interposing relay to interface the signals between mismatching systems, implementations can use network interfaces between equipment in the field and the control system for transmitting commands and receiving feedbacks. Indeed, the ISMCC is capable of driving the loads in the field through local circuits by obtaining commands and sending feedback through communication cards running on the network interfaces.

Figure 3:
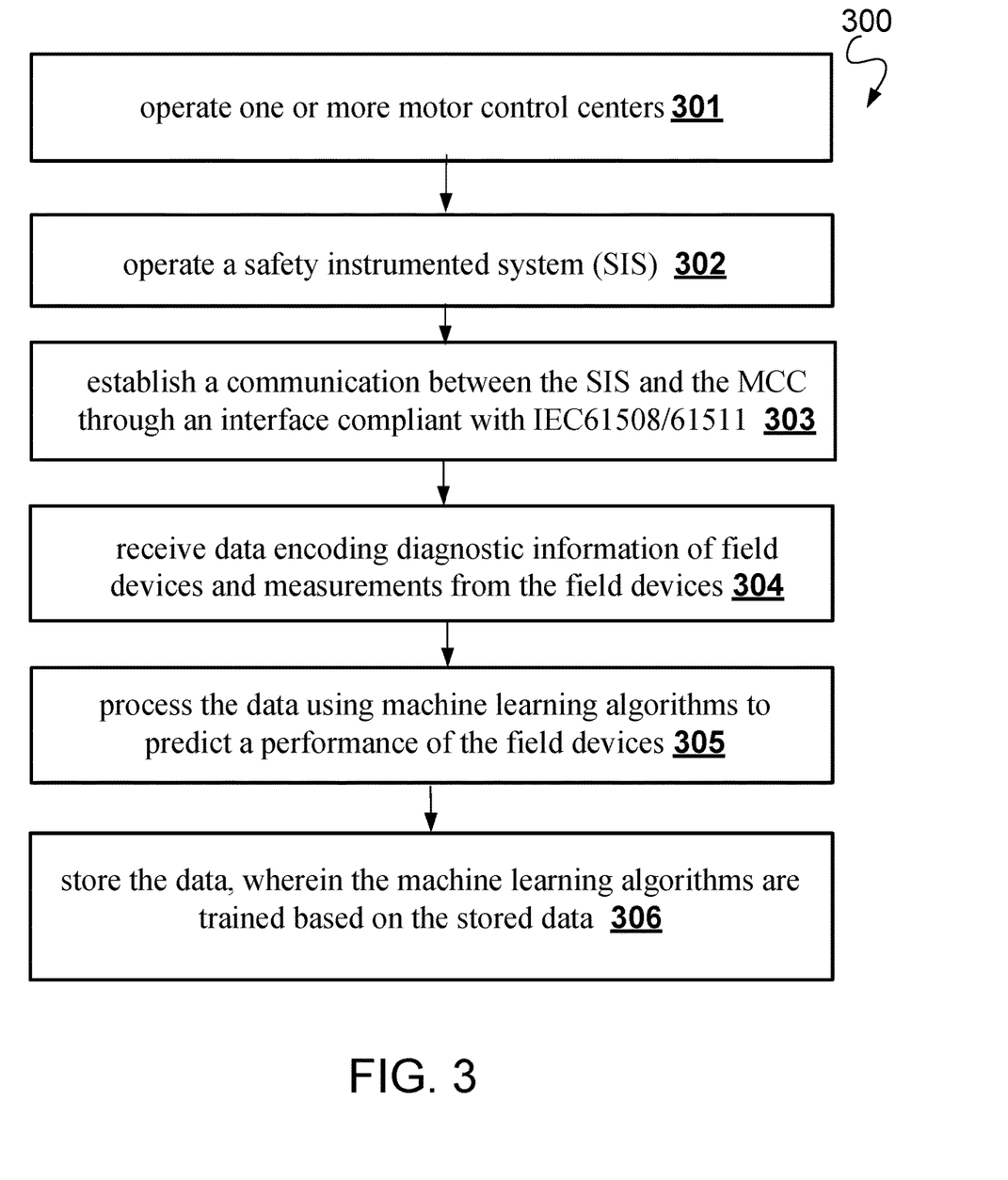
FIG. 3 is an example of a flow chart according to an implementation of the present disclosure.

FIG. 3 illustrates a flow chart 300 according some implementations of the present disclosure. An example of a process may include operating one or more motor control centers (301), such as ISMCC 101, each including a network interface compliant with a functional safety standard of, for example, IEC61508/61511. Each motor control center is coupled to one or more field devices, such as valves, pumps, motors, robotics that are dispersed in a gas and oil facility spanning over a large geographic area. Each field device can generate diagnostic information about its operating status.

Each field device can also obtain measurement data, such as pressure, flow rate, and volume. Each motor control center can communicate with the field devices via a communication protocol such as a HART protocol, a Foundation Fieldbus protocol, or a RS 485 protocol. Each motor control center can additionally include a programmable logic controller (PLC). The programmable logic controller can include a computing module configured to receive the diagnostic information and measurement data (304), and process the diagnostic information and measurement data to predict a performance of the field devices (305). The PLC may invoke machine learning algorithms, which can be trained based on the diagnostic information and measurement data. In some cases, the PLC can store the diagnostic information and measurement data (306).

As illustrated, the process may include operating a safety instrumented system (302). The process may then establish a communication between the safety instrumented system and the motor control center through the network interface compliant with the industrial safety standard IEC61508/ 61511 (303). In some implementations, the safety instrumented system can receive information from the motor control centers in real-time. In these implementations, the motor control center and the safety instrumented system are synchronized with an accuracy under 1 millisecond. The safety instrumented system can itself be rated SIL 3 in terms of fault tolerance. For example, the safety instrumented system can include triplicate components as redundant provisions.

Figure 4:
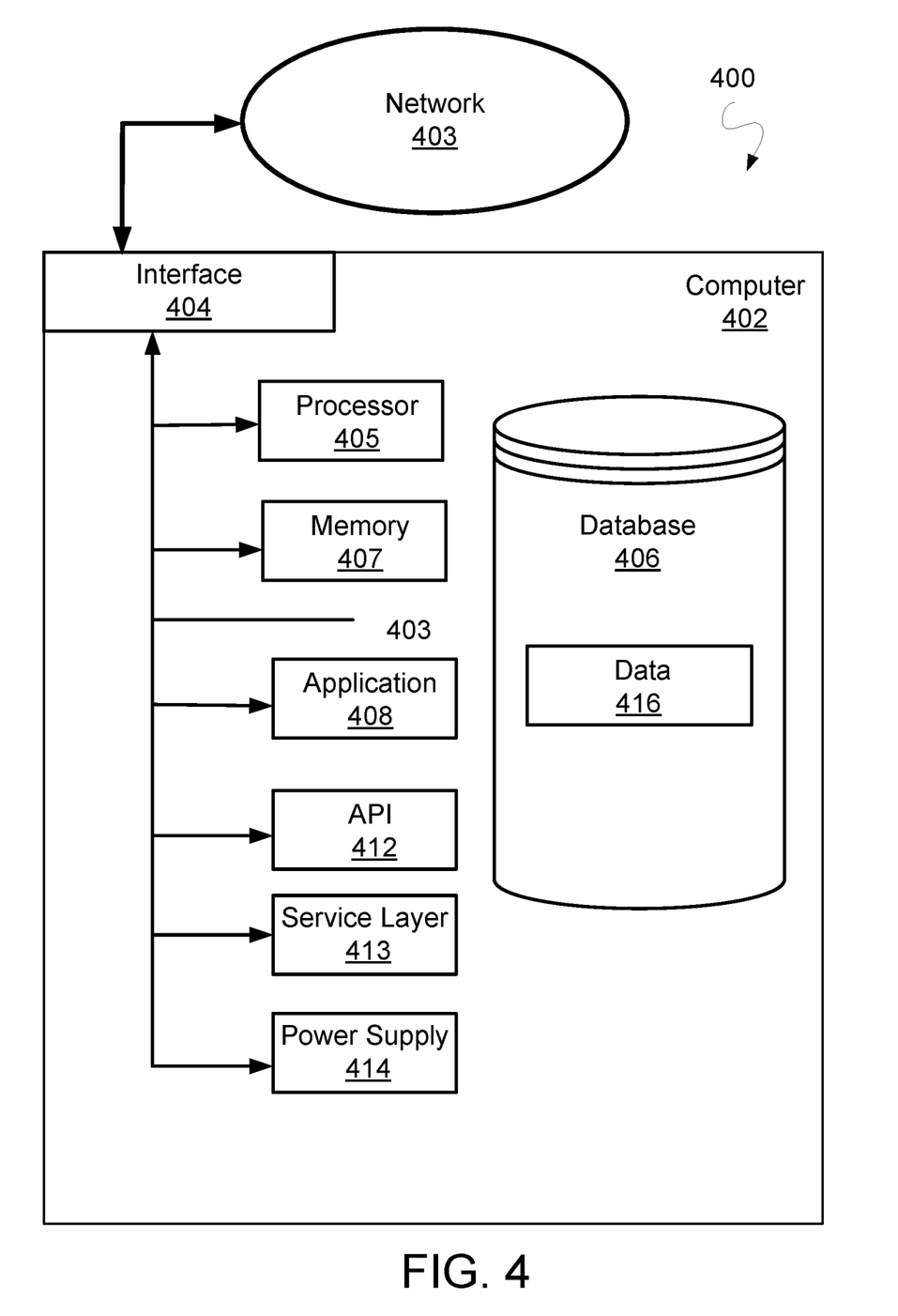
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 403. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 403 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a network 403 (or system bus). In some implementations, any or all of the components of the computer 402, including hardware, software, or a combination of hardware and software, can interface over the network 403 (or system bus) using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 403 in a distributed environment. Generally, the interface 404 is operable to communicate with the network 403 and comprises logic encoded in software, hardware, or a combination of software and hardware. More specifically, the interface 404 can comprise software supporting one or more communication protocols associated with communications such that the network 403 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 403 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds the previously described data 416 including, for example, multiple streams of data from various sources, such as measurement data and diagnostic information from the field devices coupled to each motor control center, as shown in FIG. 1.

The computer 402 also includes a memory 407 that can hold data for the computer 402, another component or components communicatively linked to the network 403 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 403. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system to implement a safety control at an oil and gas facility, the system comprising:
   one or more motor control centers, each comprising a network interface that is an optical network interface, and a programmable logic controller (PLC) that includes a computing module comprising a processor and at least one memory in communication with the processor,
   wherein each motor control center is configured to monitor and control one or more field devices coupled thereto,
   wherein a plurality of field devices are dispersed at the oil and gas facility, wherein the processor is configured to:
   receive data encoding diagnostic information of the one or more field devices and measurements from the one or more field devices, and
   process the data using machine learning algorithms to predict a performance of the one or more field devices; and
   a safety instrumented system (SIS) in communication with the one or more moto control centers solely through the optical network interface thereof,
   wherein each motor control center is configured to communicate with the safety instrumented system without an interposing relay located between each motor control center and the safety instrumented system,
   wherein the safety instrumented system comprises a computer processor configured to implement the safety control at the oil and gas facility based on communication with each motor control center through the network interface thereof,
   wherein each motor control center and the safety instrumented system are synchronized with an accuracy under 1 millisecond, and
   wherein each motor control center comprises triplicate or 1oo2D (one-out-of-two with diagnostics) components such that each motor control center is rated SIL (Safety Integrity Level) 3 for operating at a SIL 3 level of fault tolerance while communication between the SIS and each motor control center achieves redundancy with reduced cost and latency in the absence of the interposing relay.

2. The system of claim 1, wherein the network interface is configured to accommodate at least one redundant communication path from each motor control center to the safety instrumented system.

3. The system of claim 1, wherein the network interface is compliant with a safety standard for automatic protection of the field devices dispersed at the oil and gas facility.

4. The system of claim 3, wherein the safety standard comprises one of: an International Electrotechnical Commission (IEC) 61508 standard, an IEC 61511 standard.

5. The system of claim 1, wherein each motor control center is configured to communicate with the one or more field device according to a communication protocol, wherein the communication protocol comprises one of: a Highway Addressable Remote Transducer (HART) protocol, a Foundation Fieldbus protocol, or a RS 485 protocol.

6. The system of claim 1, wherein the computing module is further configured to store the data at the at least one memory, and wherein the machine learning algorithms are trained based on the stored data.

7. A method to implement a safety control of an industrial process running at an oil and gas facility, the method comprising:
operating one or more motor control centers, each comprising that is an optical network
interface, and a programmable logic controller (PLC) that includes a computing module comprising a processor and at least one memory in communication with the processor,
wherein each motor control center is configured to monitor and control one or more field devices coupled thereto,
wherein a plurality of field devices are dispersed at the oil and gas facility, wherein the processor is configured to:
receive data encoding diagnostic information of the one or more field devices and measurements from the one or more field devices, and
process the data using machine learning algorithms to predict a performance of the one or more field devices; and
operating a safety instrumented system (SIS) in communication with the one or more moto control centers solely through the optical network interface thereof,
wherein each motor control center is configured to communicate with the safety instrumented system without an interposing relay located between each motor control center and the safety instrumented system,
wherein the safety instrumented system comprises a computer processor configured to implement the safety control at the oil and gas facility based on communication with each motor control center through the network interface thereof,
wherein each motor control center and the safety instrumented system are synchronized with an accuracy under 1 millisecond, and
wherein each motor control center comprises triplicate or 1oo2D (one-out-of-two with diagnostics) components such that each motor control center is rated SIL (Safety Integrity Level) 3 for operating at a SIL 3 level of fault tolerance while communication between the SIS and each motor control center achieves redundancy with reduced cost and latency in the absence of the interposing relay.

8. The method of claim 7, further comprising: establishing, through the network interface, at least one redundant communication path from each motor control center to the safety instrumented system.

9. The method of claim 7, wherein the network interface is compliant with a safety standard for automatic protection of field devices operating at the oil and gas facility.

10. The method of claim 9, wherein the safety standard comprises one of: an International Electrotechnical Commission (IEC) 61508 standard, an IEC 61511 standard.

11. The method of claim 7, wherein each motor control center is configured to communicate with the one or more field device according to a communication protocol, wherein the communication protocol comprises one of: a Highway Addressable Remote Transducer (HART) protocol, a Foundation Fieldbus protocol, or a RS 485 protocol.

12. The method of claim 7, wherein the computing module is further configured to store the data at the at least one memory, and wherein the machine learning algorithms are trained based on the stored data.

* * * * *

UNITED STATES PATENT AND TRADEMARK OFFICE
CERTIFICATE OF CORRECTION

PATENT NO. : 11,687,053 B2
APPLICATION NO. : 17/194927
DATED : June 27, 2023
INVENTOR(S) : Bander R. Al-Yousef, Mohammed S. Al-Ahmadi and Soloman Moses Almadi Page 1 of 1

It is certified that error appears in the above-identified patent and that said Letters Patent is hereby corrected as shown below:

In the Claims

In Column 14, Line 28, Claim 1, please replace "moto" with -- motor --.

In Column 15, Line 24, Claim 7, please replace "moto" with -- motor --.

Signed and Sealed this
Fifteenth Day of August, 2023

Katherine Kelly Vidal
*Director of the United States Patent and Trademark Office*